Figure 1:
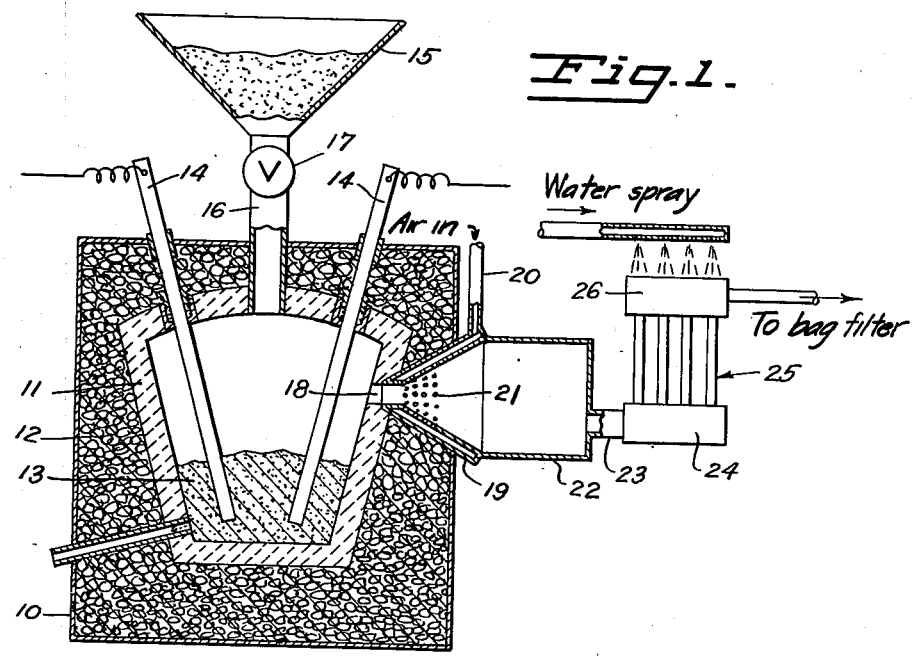

Oct. 30, 1951  J. L. PORTER  2,573,057

PROCESS OF PREPARING WHITE FINELY DIVIDED AMORPHOUS SILICA
Filed Sept. 11, 1947

INVENTOR.
JOHN L. PORTER
BY James E. Toomey

Patented Oct. 30, 1951

2,573,057

UNITED STATES PATENT OFFICE 2,573,057

PROCESS OF PREPARING WHITE FINELY DIVIDED AMORPHOUS SILICA

John L. Porter, Palo Alto, Calif., assignor to Kaiser Aluminum & Chemical Corporation, a corporation of Delaware Application September 11, 1947, Serial No. 773,404

7 Claims. (Cl. 23—182)

This invention relates to the preparation of finely divided, amorphous silica, particularly by a process wherein the silica is formed by oxidation in the vapor phase of silicon monoxide.

Many processes have been proposed in the past for the preparation of finely divided, amorphous silica. Among these have been the preparation of a fine brown powder, called silicon monoxide, and its subsequent oxidation by suspending the powder in a heated oxidizing atmosphere and so converting it to silica. This process has been found to have the disadvantage that the "silicon monoxide" actually comprises at least an appreciable proportion of silica in crystalline form and silicon and silicon carbide. The two latter components impart the brown color and are extremely difficult, or impossible, to remove by oxidation in the solid state, apparently due to the circumstance that they form the core of the powder particles and are effectively protected by a coating of silica. Another method proposed has been the blowing of air into a furnace wherein silica is being reduced by carbon, silicon or other reducing agent, and silicon monoxide vapor is being evolved. It has found in practice that this also leads to the production of a dark powder because it apparently effects condensation or deposition of the monoxide and/or of silica, silicon, carbon or silicon carbide before complete oxidation, which is necessary for the production of white, pure, amorphous silica, can be effected.

A special problem in the preparation of a white amorphous product has been to prevent carry-over or formation of silicon carbide. This substance tends to deposit in crystalline form in the silica product, and it imparts a gray color to the silica. Therefore, it is necessary to maintain the gases containing this product at high temperatures until the silicon carbide is oxidized in order to prevent deposition of the silica around particles of the carbide, and therefore to prevent contamination by the latter of the final silica product. In the preparation of amorphous silica by reduction of siliceous material to produce gaseous reduction products of silica, believed to be mainly silicon monoxide, which are subsequently re-oxidized, it has been found that silicon carbide is formed in the electric furnace either from the carbon reducing agent, or if silicon or other substance is the reducing agent, this contaminant is formed by reaction of the carbon electrodes. That is to say, the carbon of the electrode will react with some constituent of the reaction mass to produce appreciable and undesirable amounts of silicon carbide.

According to the present invention, it has now been found that white, finely divided amorphous silica in spherical particles is produced by reacting, in an electrically-conducting composition molten at the temperature of reaction, siliceous material with a reducing agent which yields gaseous products of reduction, and then oxidizing the reduction products while maintaining them in the gaseous state. Preferably, the gaseous products issuing from the reduction zone are maintained at a temperature of at least 1600° C. until oxidation is effected. The finely divided silica produced forms a suspension in the oxidized gas mixture and is preferably mechanically separated therefrom. The electrodes are maintained in contact with the molten mass, or immersed therein, so that the current flows through the melt and no arc is formed during the reaction.

The siliceous material which is useful includes any massive or crystalline forms of silica, such as, for example, sand, quartz, clay, kaolin, massive amorphous silica, flint, etc. These materials can be ground prior to use, or they can be crushed to convenient sizes for charging to the reaction zone. The siliceous starting material can be fed into the reaction zone loosely mixed with the reducing agent. Alternatively, the silica can be added to the electrically-conducting material to form a uniform molten mass and the reducing agent can be added thereto.

The reducing agents useful in this invention include, for instance, carbon, graphite, coal, coke, silicon, etc. The silicon can be employed as the element or in the form of ferrosilicon, and this alloy can contain varying percentages of silicon.

The electrically-conducting composition is a material which is molten at the temperature of the reduction reaction and which does not deleteriously affect the course of the reaction. Advantageously, a conducting silicate slag is employed. A suitable material is a calcium magnesium silicate which has the composition of diopside, $CaO.MgO.2SiO_2$. This composition has a melting point of around 1400° C. When quartz is added to it, to provide the silica starting material, the resulting slag, having a silica content of between 40% and 60% by weight, has a melting point below 1600° C. and is a preferred composition. When using this slag, the temperature of the reduction is suitably between about 1600° C. and 1700° C. when using a carbonaceous reducing agent; and a little higher, that is, between 1700° C. and 1800° C. when using silicon or ferrosilicon reducing agent. Preferably the temperatures are held below 1800° C. within the ranges noted, in order to prevent reduction of the MgO in the melt to produce magnesium metal vapor. Other compositions which are useful as the conducting melt are silicates of calcium, magnesium and aluminum, preferably mixed silicates, having a silica content of 40% to 60% and molten at the temperature of reactions. It is preferred that the presence of more than about 20% of alumina, $Al_2O_3$, in the slag be avoided. The alumina content of the melt tends to build up from the coke and quartz or other source of silica, and the slag is wholly or partially renewed at intervals, in a continuous reducing operation to keep the alumina content below 20%.

The reactions involved in the process of this invention include the reduction of silica by carbon:

$$SiO_2 + C = SiO + CO \quad (1)$$
$$SiO_2 + 2C = Si + 2CO \quad (2)$$

and the reduction of silica by silicon $$SiO_2 + Si = 2SiO \quad (3)$$

followed by oxidation of the monoxides formed in the first three reactions:

$$2SiO + O_2 = 2SiO_2 \quad (4)$$
$$2CO + O_2 = 2CO_2 \quad (5)$$

The first three reactions proceed in the reducing zone, and go to the right at temperatures of 1600° C. or above. In the mixture of the gaseous products of reduction, the silicon monoxide will react with the SiO or with CO, or, in other words, with the products of the reduction, to give undesired reaction products, at temperatures below 1600° C. These undesired reaction products include silicon, carbon and silicon carbide.

In addition to the reactions shown above, silicon carbide is formed by reaction of the carbon of the electrodes which are in contact with the slag. The silicon carbide slowly reacts with silica to give SiO and CO. Thus, it has now been determined that there is always some CO in the products from the reduction zone even though carbon may not be relied upon as the principal reducing agent. When the temperature of the issuing gases falls below about 1600° C., the undesired reactions proceed as stated above and there is deposited from the gaseous reduction products, a finely divided silica contaminated by silicon, silicon carbide, and carbon. It may be, in the case of silicon monoxide reversion, that solid silicon monoxide deposits and the reversion to silica and silicon occurs in the solid state, but whatever the mechanism of this reversion, the product collected from such a deposit comprises a substantial proportion of silica containing silicon. If solid silicon monoxide is deposited, it is not stable. In any case, the product if deposited before oxidation is effected, includes silica encasing particles of silicon, silicon carbide and carbon. A surface film of silica apparently protects these inclusions and prevents their oxidation after solidification has occurred.

It has been found, therefore, that the gases issuing from the reduction zone should preferably be maintained at a temperature of at least 1600° C., until the oxidizing agent is added. The oxidizing agent is preferably air, or oxygen or an oxygen-yielding gas. It is sometimes advantageous to add a considerable excess of air because this cools the silica particles to a temperature at which devitrification is very slow and aids in maintaining the silica in the amorphous state. Further advantages of this cooling are that the condenser and connections are not heated to an undesirable degree, and less subsequent cooling is required to bring the silica fume-gas mixture down to a temperature suitable for its introduction into the solids-collecting device, which is conveniently a bag filter system.

In general, it is advantageous to employ a carbon reducing agent in the present process, not only because this is a cheaper and more abundant material than silicon but also because the whiteness of the silica obtained as a final product is favorably influenced. This is believed to be due to the fact that a higher proportion of CO in the gases to be oxidized result, upon its oxidation, in the liberation of a greater amount of heat, ensuring more rapid and complete oxidation of the SiO and preventing even slight reversion. The silica made according to this invention shows an amorphous structure, with no lines for silicon, carbon or silicon carbide when examined by X-ray diffraction.

Figure 2:
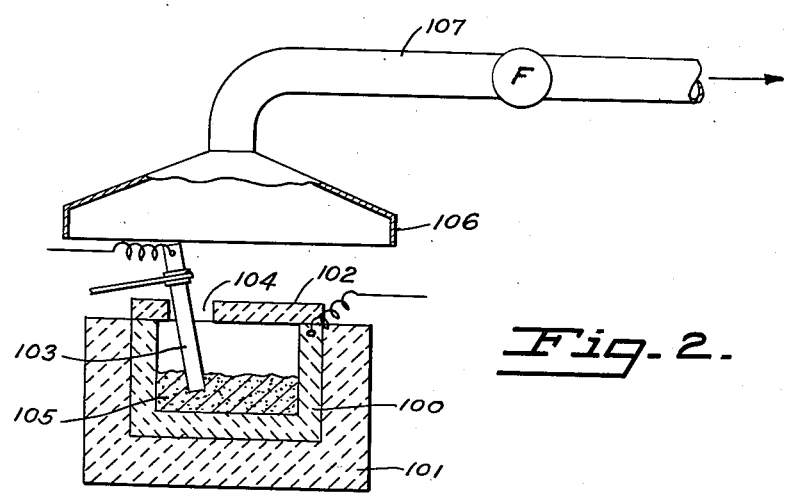

Figure 1 is a diagrammatic sketch of an apparatus suitable for carrying out the process of this invention on a large scale and, if desired, continuously. Figure 2 is a sketch of an apparatus suitable for reacting smaller batches.

Figure 1 represents an electric furnace comprising a steel shell 10, enclosing a crucible 11, the space between the crucible and shell being filled with a heat-insulating material 12. When the crucible is of graphite, the heat-insulating material is suitably granular carbon. When the crucible is of magnesia refractory, for example, the heat-insulating material is suitably a light-burned magnesia, loosely packed in. The crucible can be made of other highly refractory material, and other suitable insulating packing can be employed. When the refractory material is of a kind to react with the slag bed 13, the walls of the crucible are preferably cooled, for example by passing water or other cooling fluid through pipes embedded therein (not shown) in such a way as to maintain a thin layer of solidified slag on that inner portion of the walls in contact with the slag. Electrodes 14, suitably insulated, pass through the roof of the furnace and the crucible cover, and extend downwardly so that their lower ends are immersed in slag 13, which is molten at the temperature of reaction. The electrodes are connected to suitable sources of current (not shown). A hopper 15 above the furnace serves to feed slag and reaction charge to the crucible. It is connected with the crucible by conduit 16 which passes through an aperture in the crucible cover. Flow of material is controlled, or stopped, by suitable control valve 17.

A slag charge is fed into the crucible by way of hopper 15 and conduit 16, and current is applied until the mass becomes molten. Then a feed charge, containing siliceous material and a reducing agent in approximately mol for mol proportions by weight, is placed in the hopper and allowed to flow into the crucible where it falls into the slag bed. Alternatively, slag and feed can be fed together. When the temperature in the furnace reaches the reaction temperature, say, 1600° C. or somewhat above, the hot gases from the reduction zone pass out of the furnace through aperture 18 and into oxidizing device 19. This device is frustro-conical in shape and comprises a metal shell with an inner metal lining, slightly smaller in diameter and of the same shape. The space between the shell and lining is sealed at the ends and provides a passageway for oxidizing gas, which can be air for example, which is pressed in by way of pipe 20 and passes into the interior of the cone in many small streams, through apertures 21 disposed circumferentially in its inner face near the outlet from the furnace. At this point, the gases come into contact with the hot gases of reduction and are intimately admixed therewith. The mixture goes on to surge chamber 22, where it cools partially, to about 600° C. to 1000° C., and then goes to a manifold, or distribution chamber, 24, by way of conduit 23. From manifold 24 the suspension, which comprises silica in oxidized gases, passes into pipes 25 of the cooling device. These pipes are suitably cooled by being bathed in a water spray as shown. The cooled gases, now at about room temperature, pass into collecting chamber 26 and thence go to bag filters (not shown) where the silica is filtered out and recovered. In general, the reduction furnace and oxidizing device are adaptations of the reduction furnace and chilling cone of the carbothermic magnesium process, with, however, the differences of operation indicated notably, the oxidizing device does not function as a chilling means, the oxygen-providing gas being added more slowly.

In order to draw off the slag at the end of an operation, or to draw off a portion of the slag in order to partially replenish it and maintain the desired composition of slag in a continuous operation, a draw-off conduit 27 is provided at the base of the sidewall of the crucible. The slag will solidify in the conduit if held at rest for a short time, effecting closing thereof. When it is desired to draw off slag, the conduit can be reamed open, and plugged when draw-off is finished. Replenishing amounts of slag can be mixed with the feed and introduced as desired through hopper 15.

In Figure 2, which shows a small installation suitable for working up smaller batches of material, a charge of slag-forming components and feed, as described below, for instance, is disposed within graphite crucible 100 which is held in a suitable insulating base 101. A refractory top 102 is placed in the crucible. Electrode 103, suitably supported, passes through an aperture 104 in cover 102 and extends into the slag-feed bed 105. Aperture 104 is larger than the diameter of the electrode and simultaneously, therefore, affords an outlet for the gaseous products of reduction as formed in the crucible. The graphite crucible forms the second electrode of the system and both electrodes are connected to suitable sources of current (not shown). A hood 106 is provided above the crucible assembly, with a draw-off pipe 107, leading to bag filters (not shown). A fan F is interposed in the line to draw vapors forwardly from the crucible area through the hood and pipe, and impel them onwardly toward the bag filter system. The gaseous oxidizing agent provided in this device is air which is drawn into the hood and into intimate contact with the gaseous products of reduction issuing through aperture 104, by the action of fan F. In this embodiment it is particularly advantageous to add carbon reducing agent, because of the free flow of air, as will be further explained below.

The method of carrying out the invention will be more particularly described with respect to the batch installation of Figure 2. A slag charge is prepared by mixing lime (CaO), magnesia (MgO) and sand or ground quartz ($SiO_2$) in the proportions of 1 mol weight CaO, 1 mol weight MgO and 2 mols weight $SiO_2$. One kilogram of this material is mixed with two kilograms of a feed charge, the latter consisting of sand and crushed metallurgical coke in mol weight for mol weight proportion. The whole mix is placed in the graphite crucible, cover 102 set in place, the electrode 103 adjusted so that its end will be immersed in the reacting mass, and current is applied until the charge becomes molten and attains a temperature of about 1700° C. Fan F is also started. Evolution of gaseous reduction products takes place rapidly at this temperature. These products pass out through aperture 104 and are oxidized and cooled by the large volumes of air freely drawn in under hood 106, and the resultant fume passes off through pipe 107 to the bag filters.

Advantageously, in order to oxidize and partially cool the products in the oxidizing zone, from 200 to 400 cu. ft. of air are added per pound of silica in the feed. When employing carbon reducing agent and when, therefore, the reduction products comprise SiO and also large quantities of CO, it is preferred to add 300 to 400 cu. ft. of air per pound of silica added in the feed. When silicon is the reducing agent and the reduction products comprise mainly SiO with only relatively small amounts of CO deriving from the carbon electrodes, somewhat less added air, for instance, about 200 to 300 cu. ft. of air per pound of silica fed, is suitable. It is preferred to rapidly cool the silica, once it has been oxidized, to a temperature at which devitrification is very slow, and preferably to not over 1000° C.

The suspension of silica in the gas mixture can be cooled to room temperature by adding sufficient air in the mixture as described in the example; but it is sometimes advantageous to cool the suspension in two stages, the second stage being by external cooling, instead of effecting cooling by adding larger amounts of air in the suspension, because the volume going to the bag filters is thereby decreased. In other words, the dust loading to the bag filter is increased several times, because by such external cooling the suspension contains, for example, 0.003 to 0.005 lb. silica per cubic foot of air, whereas when all cooling is done by admixing air the suspension will contain only about 0.001 lb. of silica per cubic foot of air.

The silica product prepared by the method of this invention is white, finely divided and amorphous. It has a particle size approaching the colloidal ranges. The particles are in the form of tiny spheres and it is believed, therefore, that the silica condenses first to a liquid and then very rapidly solidifies. The product of the above example shows a whiteness of 65% when examined on the spectrophotometer on the basis of zinc oxide considered as 100%. When examined by X-ray diffraction, employing a molybdenum target and zirconia filter, this silica product shows no lines developed after 16 hours' exposure, indicating the presence of no crystalline material.

What is claimed is:

1. Process of preparing white finely divided, amorphous silica in spherical particles which comprises reacting silica in a reducing zone with a carbon reducing agent, in a molten, electrically conducting silicate slag while passing an electric current through said slag to provide heat for the reaction, to produce a gaseous mixture of silicon monoxide and carbon monoxide, withdrawing said gaseous mixture from said reducing zone, oxidizing said mixture while maintaining it at a temperature of at least 1600° C. to produce a suspension of finely divided silica in a gaseous mixture, quickly cooling said suspension to a temperature of not over 1000° C., and mechanically separating the finely divided silica from the gaseous mixture.

2. Process of preparing white finely divided, amorphous silica in spherical particles which comprises reacting silica with a reducing agent, in a molten, electrically-conducting silicate slag while passing an electric current through said slag to provide heat for the reaction, to produce gaseous products of reduction including silicon monoxide, withdrawing said gaseous products, and oxidizing said withdrawn gaseous products while maintaining them at a temperature of at least 1600° C.

3. Process as in claim 2 wherein the reducing agent is a carbon reducing agent.

4. Process as in claim 2 wherein the reducing agent is silicon.

5. Process of preparing white finely divided, amorphous silica in spherical particles which comprises reacting silica with a carbon reducing agent in a molten, electrically-conducting slag comprising calcium silicate and magnesium silicate, while passing an electric current through said slag to provide heat for the reaction, to produce a gaseous mixture of silicon monoxide and carbon monoxide, withdrawing said gaseous mixture, maintaining said withdrawn gaseous mixture at a temperature of at least 1600° C., and intimately admixing therewith from 300 to 400 cubic feet of air per pound of silica reacted, to cause oxidation.

6. Process of preparing white finely divided, amorphous silica in spherical particles which comprises reacting silica with silicon in a reducing zone in a molten, electrically-conducting slag comprising calcium silicate and magnesium silicate, while passing an electric current through said slag to provide heat for the reaction, to produce gaseous silicon monoxide, withdrawing said gaseous monoxide, maintaining said gaseous monoxide at a temperature of at least 1600° C. and intimately admixing therewith from 200 to 300 cubic feet of air per pound of silica reacted, to cause oxidation.

7. Process of preparing white finely divided, amorphous silica in spherical particles which comprises reacting silica with a carbon reducing agent, at a temperature of from 1600° C. to 1700° C., in an electrically-conducting slag molten at the temperature of reaction and comprising magnesium silicate and calcium silicate in equimolecular proportions and containing not over 20% $Al_2O_3$, while passing an electric current through said slag to maintain it at the temperature of reaction, withdrawing the gaseous products of reduction comprising carbon monoxide and silicon monoxide while maintaining them at a temperature of at least 1600° C., admixing air with said withdrawn gases to cause oxidation thereof and to form a suspension of finely divided silica in oxidized gases, rapidly cooling said suspension to a temperature of not over 1000° C., then cooling said suspension to approximately room temperature, and recovering finely divided silica therefrom by filtration.

JOHN L. PORTER.

REFERENCES CITED

The following references are of record in the file of this patent:

UNITED STATES PATENTS

| Number | Name | Date |
|---|---|---|
| 1,276,499 | Dantsizen | Aug. 20, 1918 |
| 2,428,178 | Reik et al. | Sept. 30, 1947 |

FOREIGN PATENTS

| Number | Country | Date |
|---|---|---|
| 25,370 | Great Britain | of 1912 |

OTHER REFERENCES

Hackh's Chemical Dictionary (1937), 2nd ed., page 845.